(12) United States Patent
Kuroumaru et al.

(10) Patent No.: US 7,536,930 B2
(45) Date of Patent: May 26, 2009

(54) REDUCTION GEAR UNIT

(75) Inventors: Yoshikazu Kuroumaru, Kashiwara (JP); Shirou Nakano, Minamikawachi-gun (JP); Katsutoshi Nishizaki, Nabari (JP)

(73) Assignee: JTEKT Corporation, Osaka (JP)

( * ) Notice: Subject to any disclaimer, the term of this patent is extended or adjusted under 35 U.S.C. 154(b) by 368 days.

(21) Appl. No.: 10/570,297

(22) PCT Filed: Aug. 27, 2004

(86) PCT No.: PCT/JP2004/012348

§ 371 (c)(1), (2), (4) Date: Feb. 27, 2006

(87) PCT Pub. No.: WO2005/022004

PCT Pub. Date: Mar. 10, 2005

(65) Prior Publication Data

US 2007/0006674 A1  Jan. 11, 2007

(30) Foreign Application Priority Data

Aug. 28, 2003  (JP) ............................. 2003-305381

(51) Int. Cl.
F16H 57/04 (2006.01)
(52) U.S. Cl. ........................................ 74/467; 184/6.12
(58) Field of Classification Search ................ 74/467
See application file for complete search history.

(56) References Cited

FOREIGN PATENT DOCUMENTS

| JP | 47-26775 U | 8/1972 |
|---|---|---|
| JP | 63-75644 U | 5/1988 |
| JP | 1-145668 U | 10/1989 |
| JP | 06-000504 A | 1/1994 |
| JP | 09-152020 A | 6/1997 |
| JP | 11-124045 A | 5/1999 |
| JP | 2002-147575 A | 5/2002 |
| JP | 2003-002219 A | 1/2003 |
| JP | 2003-034254 A | 2/2003 |
| JP | 2003034257 A * | 2/2003 |

OTHER PUBLICATIONS

International Search Report for PCT/JP2004/012348 mailed Oct. 5, 2004.

* cited by examiner

*Primary Examiner*—Richard W Ridley
*Assistant Examiner*—Terence Boes
(74) *Attorney, Agent, or Firm*—Darby & Darby P.C.

(57) ABSTRACT

A reduction gear unit capable of reducing vibrations caused by gear rattle, while permitting some degree of backlash in a pair of gears, is provided. A reduction gear unit is so configured that a pinion shaft and a main gear shaft are disposed in parallel to each other, and a pinion 1 mounted on the pinion shaft and a main gear 2 mounted on the main gear shaft are arranged to mesh with each other, so as to transmit a rotation of the pinion shaft to the main gear shaft, and includes a housing 11 that encloses the pinion 1 and the main gear 2, where the housing 11 has an inner surface whose width, in a cross section perpendicular to an axial direction of the pinion shaft and the main gear shaft, perpendicular to an imaginary line that connects centers of the pinion shaft and the main gear shaft evenly increases from a pinion side toward a main gear side between ends of arcuate regions respectively enclosing the main gear and the pinion. The housing 11 contains a resin lubricant of a sufficient amount for immersing a part of a portion where the pinion 1 and the main gear 2 mesh with each other.

4 Claims, 6 Drawing Sheets

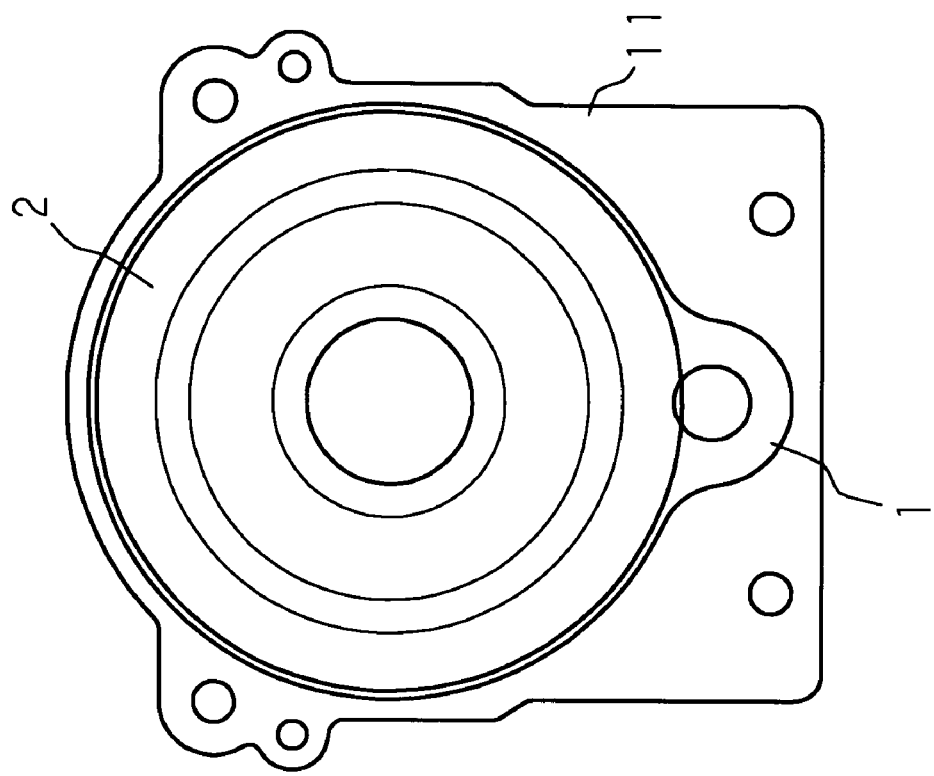
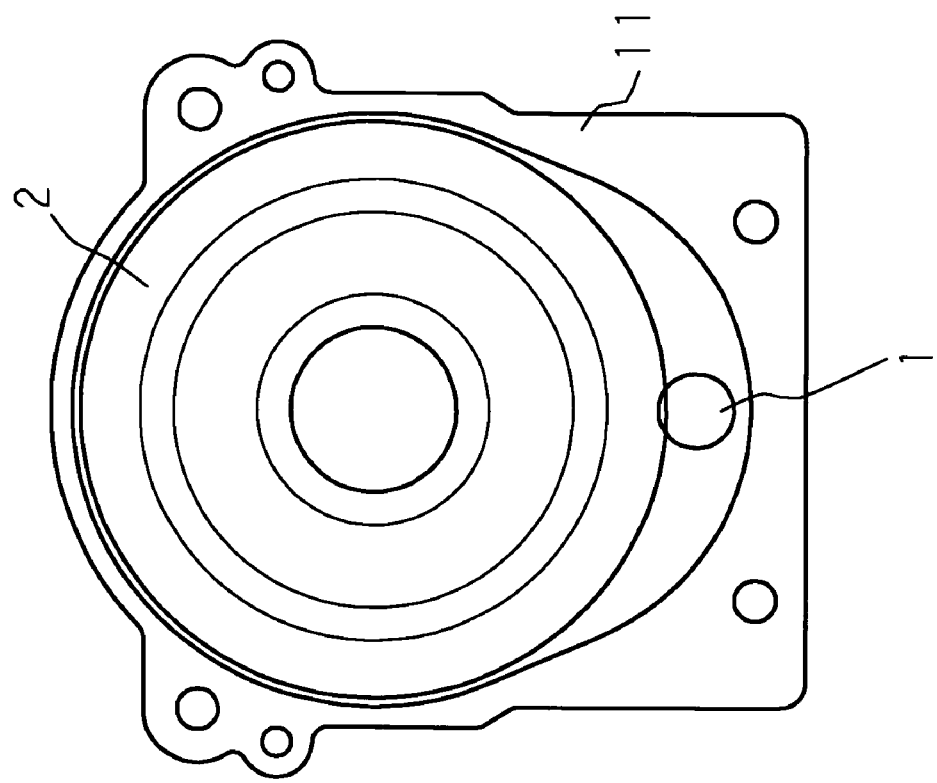

REDUCTION GEAR UNIT

CROSS-REFERENCE TO RELATED APPLICATIONS

This application is the national phase under 35 U.S.C. § 371 of PCT International Application No. PCT/JP2004/012348 which has an International filing date of Aug. 27, 2004 and designated the United States of America.

TECHNICAL FIELD

The present invention relates to a reduction gear unit capable of reducing a speed of supplemental torque that assists a steering operation, and transmitting the reduced speed to a steering shaft.

BACKGROUND ART

In recent years, electric power steering devices employing an electric motor in a steering assist mechanism are commonly employed as steering devices for automobiles. Such a conventional steering device typically transmits a rotational torque generated by the electric motor to a steering column as supplemental torque by way of a worm gear.

However, because transmission efficiency of worm gears is in such a low range as 60% to 80% in general, a larger output torque from the electric motor is needed in order to maintain a constant reduction ratio, thereby leading to a larger external diameter of the electric motor. Therefore, such electric power steering devices adopting a reduction gear unit with a worm gear therein have a problem that it is difficult to reduce overall dimensions of the electric power steering devices. In order to solve such a problem, the reduction gear unit having an output shaft of an electric motor mounted in parallel to a steering column and spur gears or helical gears as a reduction mechanism have been developed in these days.

Because of relatively high transmission efficiency, which is about 95%, of spur gears or helical gears, output torque generated by an electric motor can be reduced correspondingly. As a result, excessive enlargement of an external dimension of the electric motor can be avoided, so that electric power steering devices can be configured to be compact as a whole.

However, an attempt to obtain a desired reduction ratio for a reduction mechanism adopting a spur gear by a single-stage configuration, in which a gear mounted on an output shaft of an electric motor is meshed simply with a gear mounted on a steering column, makes no contribution to an effort to overcome the difficulty in configuring an electric power steering device into a compact shape as a whole due to an increase in the pitch circle of the driven gear, i.e., the gear on the steering column.

On the other hand, in case of a reduction gear unit employing a multi-stage configuration by interposing, for example, some intermediate gears rather than the simple, single-stage configuration adopting spur gears, new problems arise such as a decrease in the comfortable feeling of a steering operation due to an enlargement of the backlash, an increase in costs caused by a magnified structural complexity of the reduction gear unit, and the like.

In order to solve such problems, Patent Document 1, for example, discloses a steering device which can enable to configure a steering column assembly having an electric motor and a reduction gear unit into a compact shape as a whole through disposing the reduction gear unit comprising a pair of spur gears or helical gears set to have a high reduction ratio in a housing and mounting the electric motor proximately to the housing.

Also, Patent Document 2 discloses a reduction gear unit in which a housing enclosing gears is filled with an oil and fat lubricant in order to reduce vibrations and the like caused by gear rattle when a worm gear has been used.

Patent Document 1 Japanese Patent Application Laid-Open No. 11-124045

Patent Document 2 Japanese Patent Application Laid-Open No. 2002-147575

DISCLOSURE OF THE INVENTION

Problems to be Solved by the Invention

However, in the case where some degree of the backlash is allowed in a pair of gears, if a reaction force having a relatively high frequency is input into a rack shaft from the road surface, vibrations caused by noises called "gear rattle" is intensified. When a worm gear is employed as in the conventional art, although an attempt to reduce the vibrations resulting from the gear rattle is made by minimizing the backlash by adjusting a center-to-center dimension of the gears and the like, this in turn causes problems of reduction in the transmission efficiency of the reduction gear unit, and increase in the number of work steps for matching and adjustments.

The attempt to dampen vibrations caused by the gear rattle through filling a housing that encloses gears with an oil and fat lubricant having a high viscosity as in the case of Patent Document 2 has problems that the feeling of viscous resistance against input rotational torque is strengthened and also the feeling of steering and a response to a steering operation are deteriorated.

In view of the situations as described above, the present invention is devised with an object to provide a reduction gear unit capable of reducing vibrations caused by the gear rattle while permitting some degree of the backlash in a pair of gears.

Means for Solving the Problems

In order to attain the object described above, a reduction gear unit in accordance with the first invention is configured so that a pinion shaft and a main gear shaft are disposed in parallel to each other, a pinion mounted on the pinion shaft and a main gear mounted on the main gear shaft are arranged to mesh with each other, so as to transmit a rotation of the pinion shaft to the main gear shaft wherein, the unit comprises a housing that encloses the pinion and the main gear, and the housing has an inner surface whose width, in a cross section perpendicular to an axial direction of the pinion shaft and the main gear shaft, perpendicular to an imaginary line that connects centers of the pinion shaft and the main gear shaft evenly increases from a pinion side toward a main gear side between ends of arcuate regions respectively enclosing the main gear and the pinion.

In case of the reduction gear unit in accordance with the first invention, a housing is provided for enclosing a pair of a pinion and a main gear and the interior of the housing is configured into a smooth profile that may allow an oil and fat lubricant to flow smoothly therein. When the housing is filled with an oil and fat lubricant, the oil and fat lubricant is allowed to flow smoothly following changes of the vehicle position, thereby any irregularity in the feeling of a steering operation originated in an increase or decrease in vibrations caused by the gear rattle in association with the changes in vehicle positions may be diminished.

Also, in case of the reduction gear unit in accordance with the second invention, the housing contains an oil and fat lubricant of an amount for immersing a part of a portion where the pinion and the main gear mesh with each other.

In case of the reduction gear unit in accordance with the second invention, because a housing is provided for enclosing a pair of pinion and a main gear, and a part of the meshing portion of the pinion and the main gear is filled with an oil and fat lubricant in the housing, vibrations caused by the gear rattle as a result of a reaction force from the road surface may be dampened without reducing the backlash and also deterioration of the feeling of and a response to a steering operation due to excessive filling of an oil and fat lubricant may be lessened.

The reduction gear unit in accordance with the third invention is characterized in that the oil and fat lubricant has a kinematic viscosity not more than 100,000 mm$^2$/s when a surrounding temperature is −30° C., and not less than 300 mm$^2$/s when the surrounding temperature is 60° C.

In case of the reduction gear unit in accordance with the third invention, because the oil and fat lubricant possesses a kinematic viscosity not more than 100,000 mm$^2$/s when the surrounding temperature in a cabin is −30° C and not less than 300 mm$^2$/s when the surrounding temperature is 60° C., vibrations caused by the gear rattle may be dampened while preventing deterioration of the feeling of and a response to a steering operation.

The reduction gear unit in accordance with the fourth invention is characterized in that one of a bearing supporting the pinion shaft, a bearing supporting the main gear shaft, or bearings supporting the pinion shaft and the main gear shaft is provided with a lubricant seal to prevent the oil and fat lubricant from leaking.

In case of the reduction gear unit in accordance with the fourth invention, because the lubricant seals are disposed either on the bearings supporting one of the pinion shaft and the main gear shaft, or on the bearings supporting the pinion shaft and the main gear shaft, any leakage of the oil and fat lubricant introduced into the housing may be prevented.

Effects of the Invention

As described in detail above, the present invention enables to dampen vibrations caused by gear rattle as a result of a reaction force from the road surface without reducing the backlash, and deterioration of the feeling of steering and a response to a steering operation due to excessive filling of oil and fat lubricant can also be diminished.

Also, because the interior of the housing is configured into a smooth profile that allows the oil and fat lubricant to flow smoothly therein, any irregularity in the feeling of a steering operation caused by changes in vehicle positions can be reduced.

BRIEF DESCRIPTION OF THE DRAWINGS

FIGS. 3A and 3B Sectional views as seen from a direction perpendicular to rotational shafts of a main gear and a pinion in another housing enclosing the pair of gears for the reduction gear unit.

Figure 1:
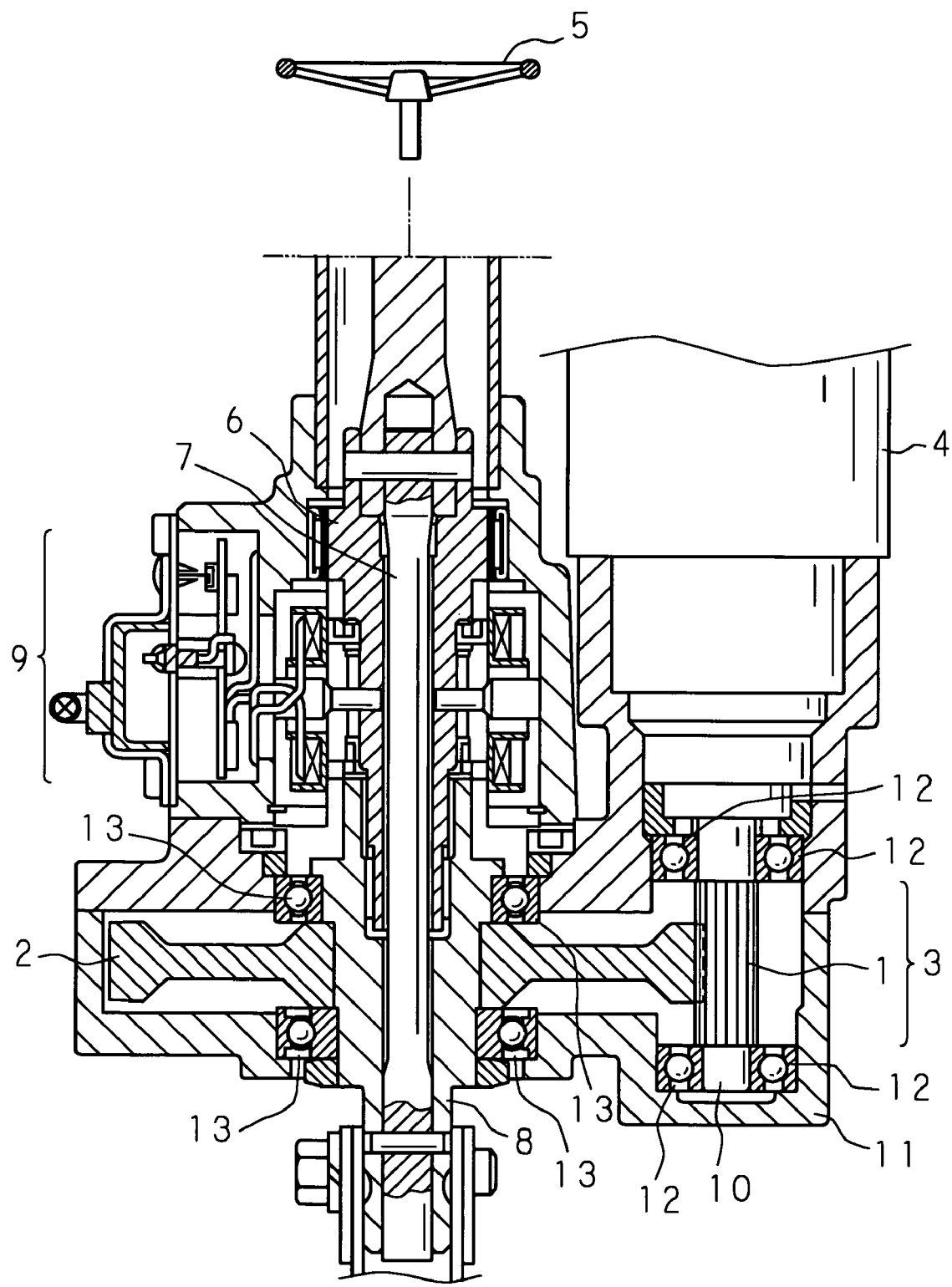
FIG. 1 A sectional view as seen on a plane including a central axis of a steering shaft and a rotation axis of an electric motor of an electric power steering device utilizing a reduction gear unit in accordance with an embodiment of the present invention.

DESCRIPTION OF THE REFERENCE NUMERALS 1 pinion
2 main gear
3 reduction gear unit
4 electric motor
5 steering wheel
6 steering shaft
7 torsion bar
8 gear shaft
10 rotational shaft
11 housing
12, 13 bearings
14 oil and fat lubricant
15 lubricant seal

BEST MODE FOR CARRYING OUT THE INVENTION

FIG. 1 is a sectional view as seen on a plane including a central axis of a steering shaft and a rotation axis of an electric motor showing an illustrative configuration of an electric power steering device utilizing a reduction gear unit in accordance with an embodiment of the present invention. As shown in FIG. 1, the electric power steering device transmits steering torque acted on a steering wheel 5 to the side of steering wheels by way of a steering shaft 6, a torsion bar 7, and a gear shaft 8 and also delivers supplemental torque generated by an electric motor 4 to the side of tire wheels by way of the gear shaft 8.

The steering shaft 6 is connected to the steering wheel 5, constituting an element of a torque transmission means which transmits steering torque acted on the steering wheel 5 to the side of tire wheels.

The torsion bar 7 connects the steering shaft 6 to the gear shaft 8 and generates a torsional deformation and a relative displacement between rotational angles of the steering shaft 6 and the gear shaft 8. The torsion bar 7 constitutes an element of the torque transmission mechanism and at the same time that of a torque detection mechanism.

The gear shaft 8 transmits steering torque received from the torsion bar 7 to the side of tire wheels as well as supplemental torque generated by the electric motor 4 and received from the reduction gear unit 3 to the side of the tire wheels. The gear shaft 8 also constitutes an element of the torque transmission mechanism.

The reduction gear unit 3 comprises a main gear 2 mounted on the gear shaft 8 and a pinion 1 mounted on a rotational shaft 10 of the electric motor 4. The main gear 2 and the pinion 1 are spur gears or helical gears. The use of spur gears or helical gears for the main gear 2 and the pinion 1 enables the transmission of supplemental torque which is an output of the electric motor 4 to the gear shaft 8 in a highly effective manner even when a larger reduction ratio has been selected.

The torque detection mechanism 9 detects steering torque by detecting a relative displacement of rotational angles of the gear shaft 8 and the steering shaft 6 brought about by the twisting of the torsion bar 7 driven by the steering torque.

Figure 2:
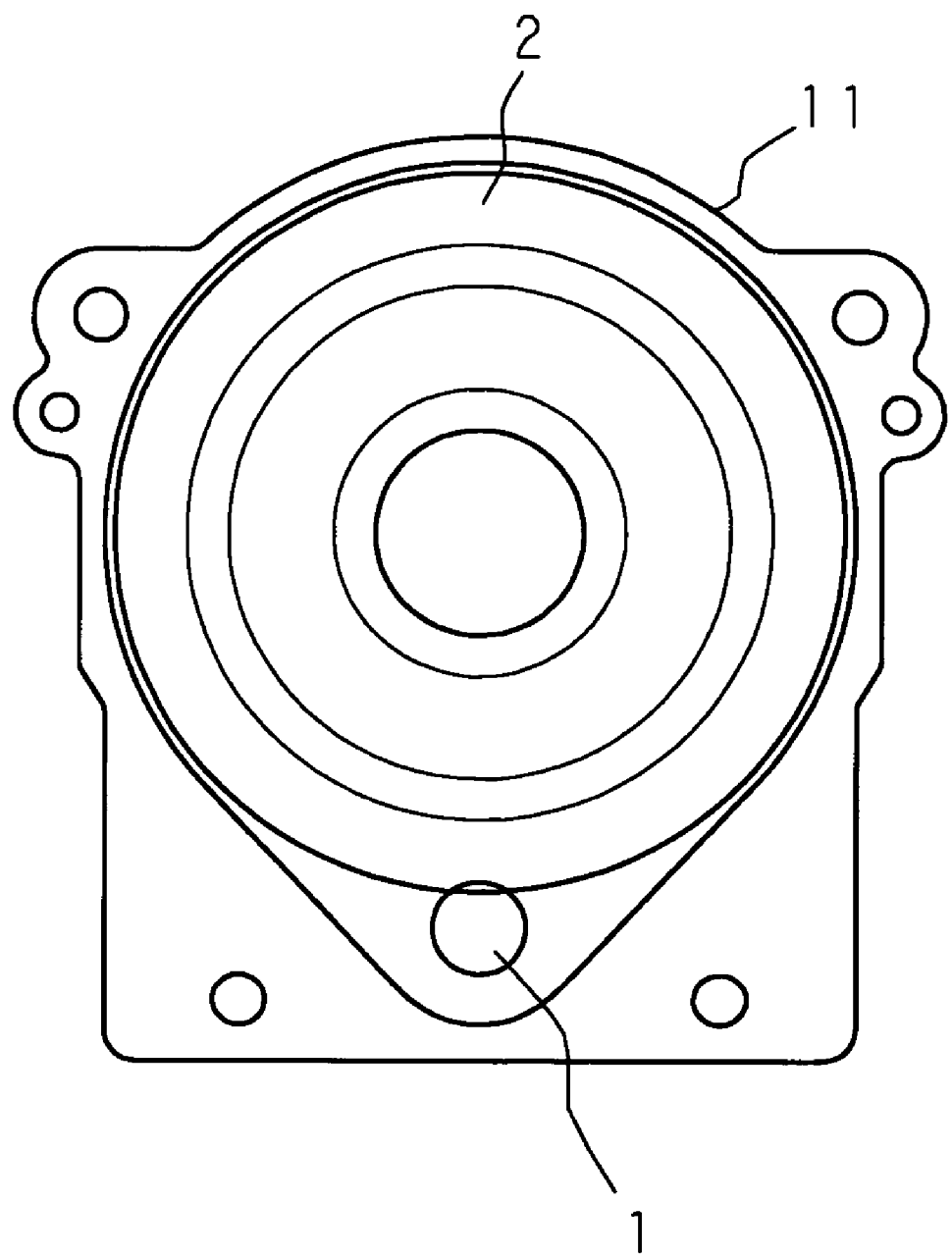
FIG. 2 A sectional view as seen from a direction perpendicular to rotational shafts of a main gear and a pinion in a housing enclosing the pair of gears for the reduction gear unit.

FIG. 2 is a sectional view as seen from a direction perpendicular to rotational shafts of the main gear 2 and the pinion 1 of the housing 11 enclosing the pair of gears of the reduction gear unit 3 in accordance with the embodiment of the present invention. End regions opposite the area where the main gear 2 and the pinion 1 mesh each other have arcuate forms to receive both gears snugly therein. The ends of the both arcs are connected by lines tangent to respective arcs.

The end regions of the housing 11 enclosing the main gear 2 and the pinion 1 are not necessarily connected by the lines tangent to the respective arcs enclosing both gears as shown in FIG. 2. For example, an arc having a larger radius may be employed for the pinion 1 as shown in FIG. 3(a) or a smooth curvature may be used instead of the arcuate form as shown in FIG. 3(b). However, as an oil and fat lubricant is introduced into the housing 11, any edges or protrusions that may check the flow of the oil and fat lubricant have to be avoided and also regions which are liable to trap the oil and fat lubricant have to be eliminated.

Consequently, it is required that the housing 11 has an inner surface whose width, when seen in a cross section perpendicular to an axial direction of the pinion shaft and the main gear shaft, perpendicular to an imaginary line that connects centers of the pinion shaft and the main gear shaft evenly increases from a pinion side toward a main gear side between ends of arcuate regions respectively enclosing the main gear 2 and the pinion 1. The adoption of such a form enables the oil and fat lubricant introduced into the housing 11 to move smoothly within the housing 11 following vehicle positions without being trapped in a region of the housing 11.

Grease and the like selected for the oil and fat lubricant is preferable to have a kinematic viscosity not more than 100,000 mm$^2$/s when the cabin temperature is −30° C., and not less than 300 mm$^2$/s when the surrounding temperature is 60° C. In general, viscosity of the oil and fat lubricant plummets as the cabin temperature increases. When viscosity has dropped below a set value, it is unlikely to produce that the feeling of viscous resistance against input rotational torque is generated, and vibrations caused by gear rattle are not dampened, and a reaction force from the road surface are not absorbed, although deterioration of the feeling of steering and a response to a steering operation can be prevented. Therefore, the selection of the oil and fat lubricant having a kinematic viscosity not less than 300 mm$^2$/s at the cabin temperature of 60° C. enables reduction of vibrations caused by the gear rattle while preventing any deterioration of the feeling of steering and a response to a steering operation.

Figure 4:
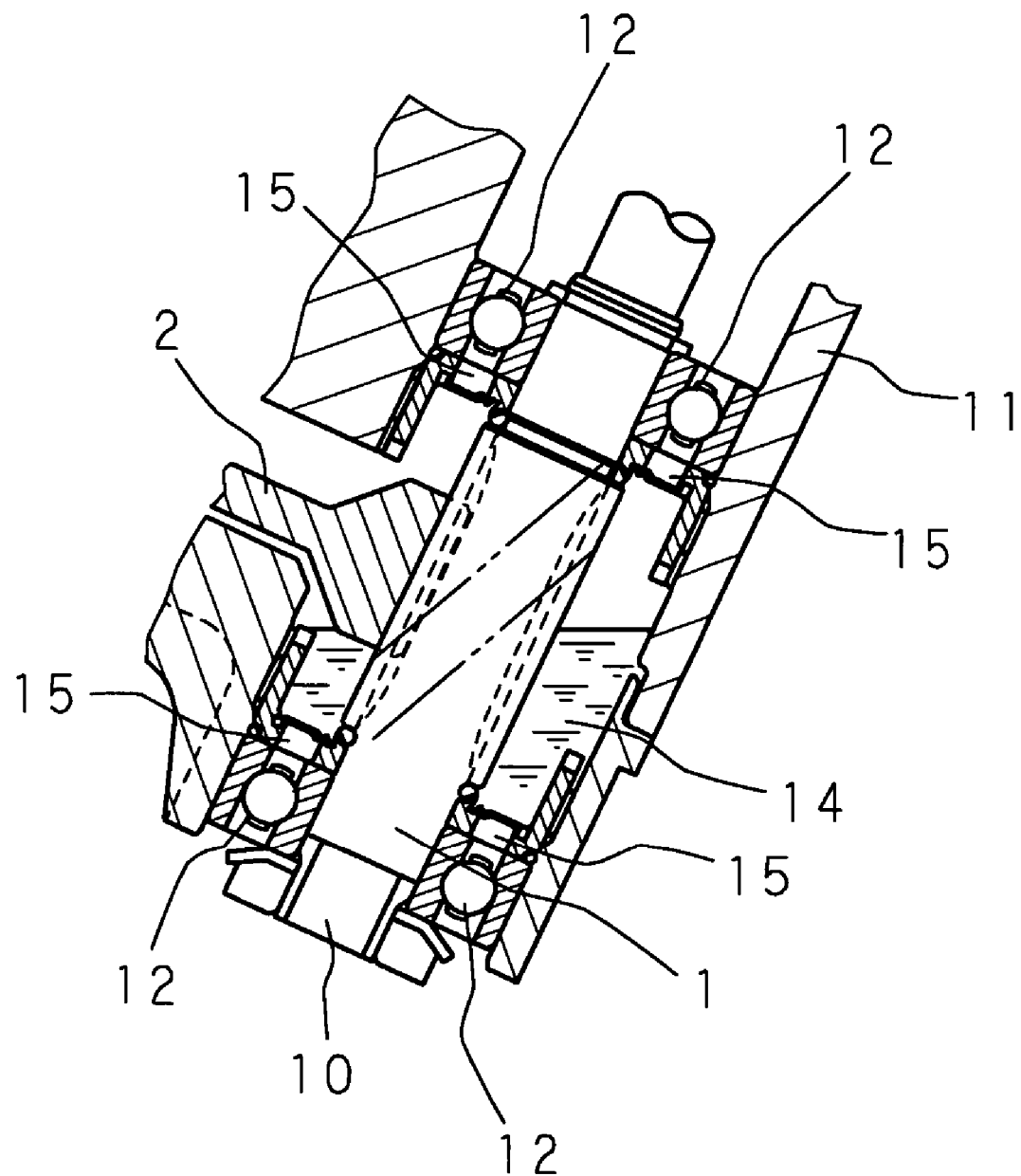
FIG. 4 A partially enlarged sectional view of the housing as seen from a side of a vehicle in a condition where an oil and fat lubricant has been introduced into the housing.

FIG. 4 is a partially enlarged sectional view of the housing 11 as seen from a side face of a vehicle in a condition where an oil and fat lubricant 14 has been introduced into the housing 11. As shown in FIG. 4, it is not necessary to fill up the hausing 11 with the oil and fat lubricant 14 but to introduce a quantity of the oil and fat lubricant 14 sufficient for emmersing a part of a meshing portion of the pinion 1 and the main gear 2. Through avoiding to fill up the housing 11 with the oil and fat lubricant 14, it becomes possible to reduce the feeling of viscous resistance against input rotational torque and also to lessen deterioration of the feeling of steering and a response to a steering operation. In addition, the presence of the oil and fat lubricant 14 can also reduce the vibrations caused by the gear rattle, and thus it is possible to balance between the vibration and the feeling of viscous resistance.

Further, in the case as shown in FIG. 4, because the quantity of the oil and fat lubricant 14 is small, a diffusion area for the oil and fat lubricant 14 resulting from changes in the vehicle position is limited. Therefore, by disposing the lubricant seals 15 on bearings 12 supporting the rotational shaft 10 on the inner sides of the housing, it is possible to prevent the oil and fat lubricant 14 from escaping to the outside of the housing 11.

Figure 5:
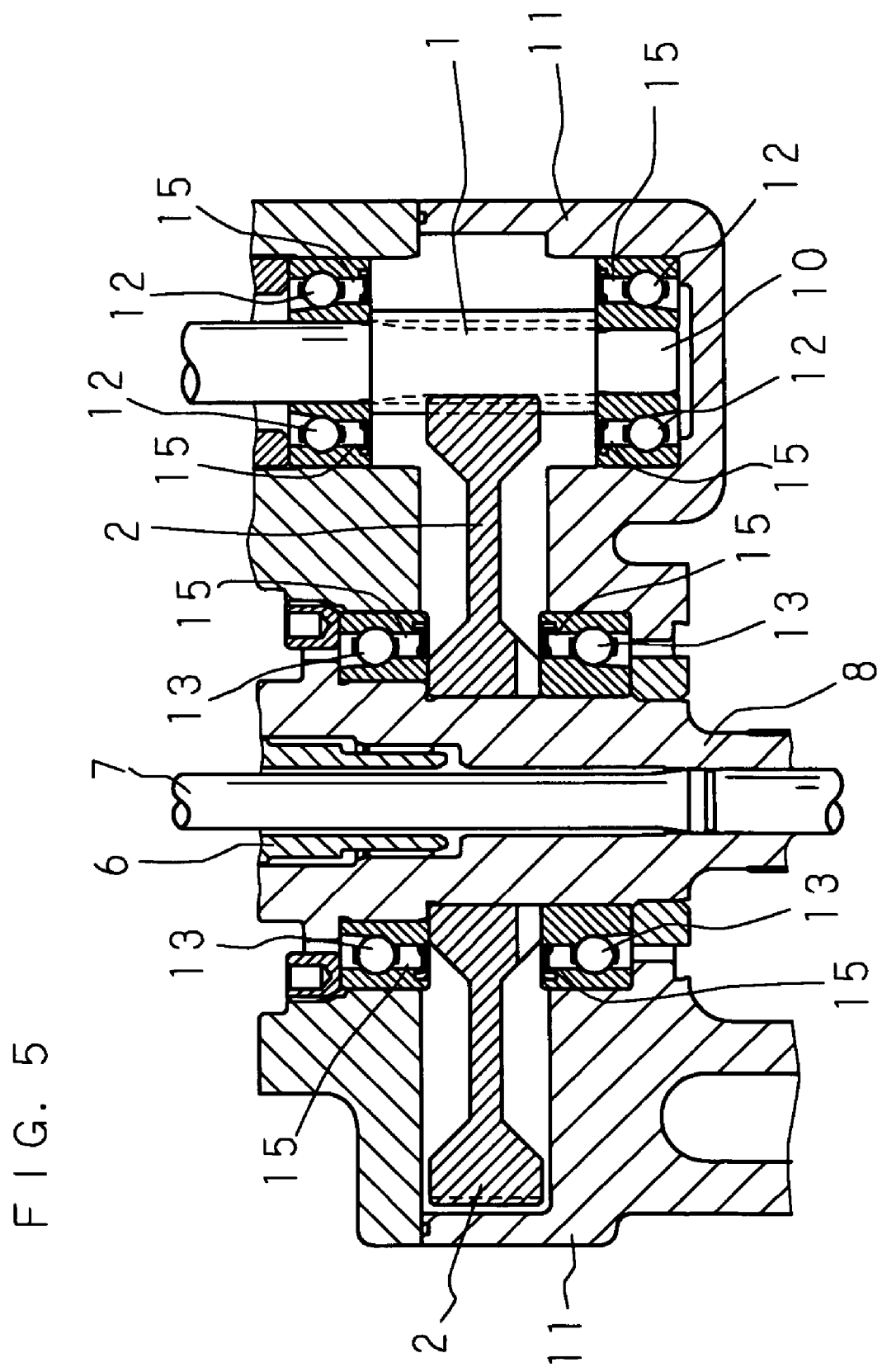
FIG. 5 A view showing an arrangement of lubricant seals in the reduction gear unit in accordance with an embodiment of the present invention.

With an increase in the quantity of the oil and fat lubricant 14, the diffusion area for the oil and fat lubricant 14 resulting from changes in the vehicle position is expanded. Therefore, as shown in FIG. 5, for example, by disposing the lubricant seals 15 also on bearings 13 supporting the gear shaft 8 on the inner sides of the housing 11, it is possible to positively prevent the oil and fat lubricant 14 from escaping to the outside of the housing 11.

Figure 6:
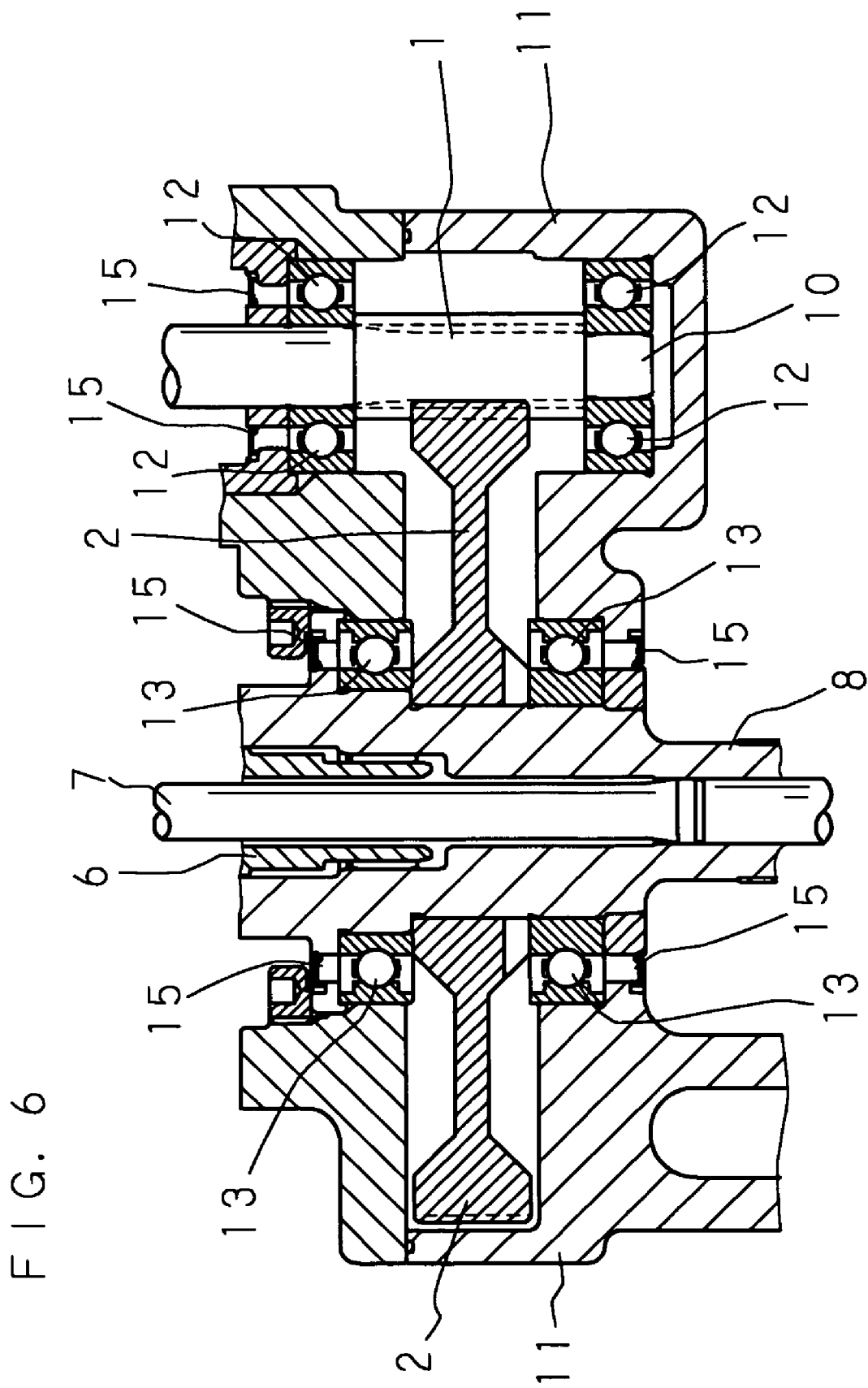
FIG. 6 A view showing an arrangement of lubricant seals in the reduction gear unit in accordance with an embodiment of the present invention.

The lubricant seals 15 are not necessarily mounted on the inner sides of the housing 11, and may be mounted on the outer sides of the housing 11, for example, as shown in FIG. 6. As to the bearings on which the lubricant seals 15 are mounted, the lubricant seals 15 may be mounted only on the bearings 12 supporting the rotational shaft 10 when the quantity of the oil and fat lubricant 14 introduced is small, and may also be mounted on the bearings 13 supporting the gear shaft 8 as the quantity of the oil and fat lubricant 14 increases.

As described above, the lubricant seals 15 mounted on the bearings may prevent the oil and fat lubricant 14 from escaping to the exterior by way of bearings even when the vehicle position changes, and can positively maintain the condition where a part of the meshing portion of the pinion 1 and the main gear 2 is immersed in the oil and fat lubricant 14. As a result, it is possible to reduce the feeling of viscous resistance against input rotational torque and also lessen deterioration of the feeling of and a response to a steering operation. In addition, the presence of the oil and fat lubricant 14 may also reduce the vibrations caused by the gear rattle, and thus it is possible to balance between the reduction in vibration and the reduction in the feeling of viscous resistance.

The invention claimed is:

1. A reduction gear unit, comprising:
   a pinion shaft and a main gear shaft that are disposed in parallel to each other;
   a pinion mounted on the pinion shaft and a main gear mounted on the main gear shaft that are arranged to mesh with each other, so as to transmit a rotation of the pinion shaft to the main gear shaft;
   a housing that encloses the pinion and the main gear, comprising:
   an inner surface whose width, in a cross section perpendicular to an axial direction of the pinion shaft and the main gear shaft, perpendicular to an imaginary line that connects centers of the pinion shaft and the main gear shaft evenly increases from a pinion side toward a main gear side between ends of arcuate regions respectively enclosing the main gear and the pinion
   a first housing region enclosing the pinion; and
   a second housing region enclosing the main gear;
   wherein the housing is oriented such that the main gear shaft is inclined with respect to a horizontal surface and such that the first housing region is disposed lower than the second housing region; and
   wherein an oil and fat lubricant is contained in a lower part of the first housing region, and
   wherein the first housing region is partially filled with the oil and fat lubricant to a predetermined fill level and a part of a meshing portion of the pinion and the main gear is immersed in the resin lubricant located below the predetermined fill level.

2. The reduction gear unit as claimed in claim 1, wherein:
the oil and fat lubricant has a kinematic viscosity not more than 100,000 mm$^2$/s when a surrounding temperature is −30° C., and not less than 300 mm$^2$/s when the surrounding temperature is 60° C.

3. The reduction gear unit as claimed in claim 2, wherein:
one of a bearing supporting the pinion shaft, a bearing supporting the main gear shaft, or bearings supporting the pinion shaft and the main gear shaft is provided with a lubricant seal to prevent the oil and fat lubricant from leaking.

4. The reduction gear unit as claimed in claim 1, wherein the pinion and the main gear are helical gears.

\* \* \* \* \*